(12) United States Patent
Noguchi et al.

(10) Patent No.: US 9,015,124 B2
(45) Date of Patent: Apr. 21, 2015

(54) REPLICATION SYSTEM AND METHOD OF REBUILDING REPLICATION CONFIGURATION

(71) Applicant: Fujitsu Limited, Kawasaki-shi (JP)

(72) Inventors: Yasuo Noguchi, Kawasaki (JP); Toshihiro Ozawa, Yokohama (JP); Kazuichi Oe, Yokohama (JP); Munenori Maeda, Yokohama (JP); Kazutaka Ogihara, Hachioji (JP); Masahisa Tamura, Kawasaki (JP); Ken Iizawa, Yokohama (JP); Tatsuo Kumano, Kawasaki (JP); Jun Kato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 142 days.

(21) Appl. No.: 13/778,195

(22) Filed: Feb. 27, 2013

(65) Prior Publication Data

US 2013/0262384 A1    Oct. 3, 2013

(30) Foreign Application Priority Data

Mar. 28, 2012    (JP) ................................. 2012-074089

(51) Int. Cl.
| | |
|---|---|
| G06F 7/00 | (2006.01) |
| G06F 17/00 | (2006.01) |
| G06F 17/30 | (2006.01) |
| G06F 11/16 | (2006.01) |
| G06F 11/20 | (2006.01) |

(52) U.S. Cl.
CPC ...... *G06F 17/30575* (2013.01); *G06F 11/1662* (2013.01); *G06F 11/2094* (2013.01)

(58) Field of Classification Search
CPC ... G06F 3/0689; G06F 3/067; G06F 11/1464; G06F 11/1446; G06F 17/3007; G06F 17/30212; G06F 17/30215
USPC .......................... 707/622, 634, 636, 655, 659
See application file for complete search history.

(56) References Cited

U.S. PATENT DOCUMENTS

| | | | | |
|---|---|---|---|---|
| 7,069,295 | B2 * | 6/2006 | Sutherland et al. ........... | 709/203 |
| 7,418,621 | B2 * | 8/2008 | Ashmore ....................... | 714/6.2 |
| 7,472,240 | B2 | 12/2008 | Matsunami et al. | |
| 8,250,211 | B2 * | 8/2012 | Swildens et al. .............. | 709/225 |
| 8,560,639 | B2 * | 10/2013 | Murphy et al. ................ | 709/219 |
| 8,650,365 | B2 * | 2/2014 | Bernbo et al. ................ | 711/151 |

(Continued)

FOREIGN PATENT DOCUMENTS

| | | |
|---|---|---|
| JP | 2002-215554 | 8/2002 |
| JP | 2005-353035 | 12/2005 |

(Continued)

*Primary Examiner* — Marc Somers
(74) *Attorney, Agent, or Firm* — Fujitsu Patent Center

(57) ABSTRACT

A replication system includes N (>=3) storage devices and N nodes, connected to a host via a 1st network and connected to the N number of storage devices via a 2nd network, each to receive a request for accessing a storage device associated with itself and to have an access with a content in response to the received access request to the storage device, wherein when a node receives a write request of data from the host, each of M nodes (1<M<N) including the node stores the data in the storage device associated with itself, and if first data in a first storage device cannot be read out, the first data stored in another storage device is stored into a second storage device not stored with the first data by transmitting the first data via the second network.

6 Claims, 17 Drawing Sheets

(56) References Cited

U.S. PATENT DOCUMENTS

2009/0327642 A1  12/2009  Ogihara et al.
2011/0055621 A1* 3/2011  Mandagere et al. .............. 714/4

FOREIGN PATENT DOCUMENTS

JP    2011-095976      5/2011
WO   WO-2008/114441   9/2008

* cited by examiner

| KEY | CLUSTER NUMBER | SIZE(B) |
|---|---|---|
| α | 1 | a |
| β | 6 | b |

FIG. 9

| CLUSTER NUMBER | STATUS VALUE |
|---|---|
| 1 | 2 |
| 2 | 4 |
| 3 | END |
| 4 | 3 |
| 5 | 0 |
| 6 | END |
| 7 | 0 |
| 8 | 0 |
| Nc | 0 |

α | CLUSTER 1 | CLUSTER 2 | CLUSTER 4 | CLUSTER 3 |

β | CLUSTER 6 |

FIG. 11

| PATTERN ID | R1 | R2 | R3 | NULL(R4) |
|---|---|---|---|---|
| P1 | A | B | C | D |
| P2 | A | B | D | C |
| P3 | A | C | B | D |
| P4 | A | C | D | B |
| P5 | A | D | B | C |
| P6 | A | D | C | B |
| P7 | B | A | C | D |
| P8 | B | A | D | C |
| P9 | B | C | A | D |
| P10 | B | C | D | A |
| P11 | B | D | A | C |
| P12 | B | D | C | A |
| P13 | C | A | B | D |
| P14 | C | A | D | B |
| P15 | C | B | A | D |
| P16 | C | B | D | A |
| P17 | C | D | A | B |
| P18 | C | D | B | A |
| P19 | D | A | B | C |
| P20 | D | A | C | B |
| P21 | D | B | A | C |
| P22 | D | B | C | A |
| P23 | D | C | A | B |
| P24 | D | C | B | A |

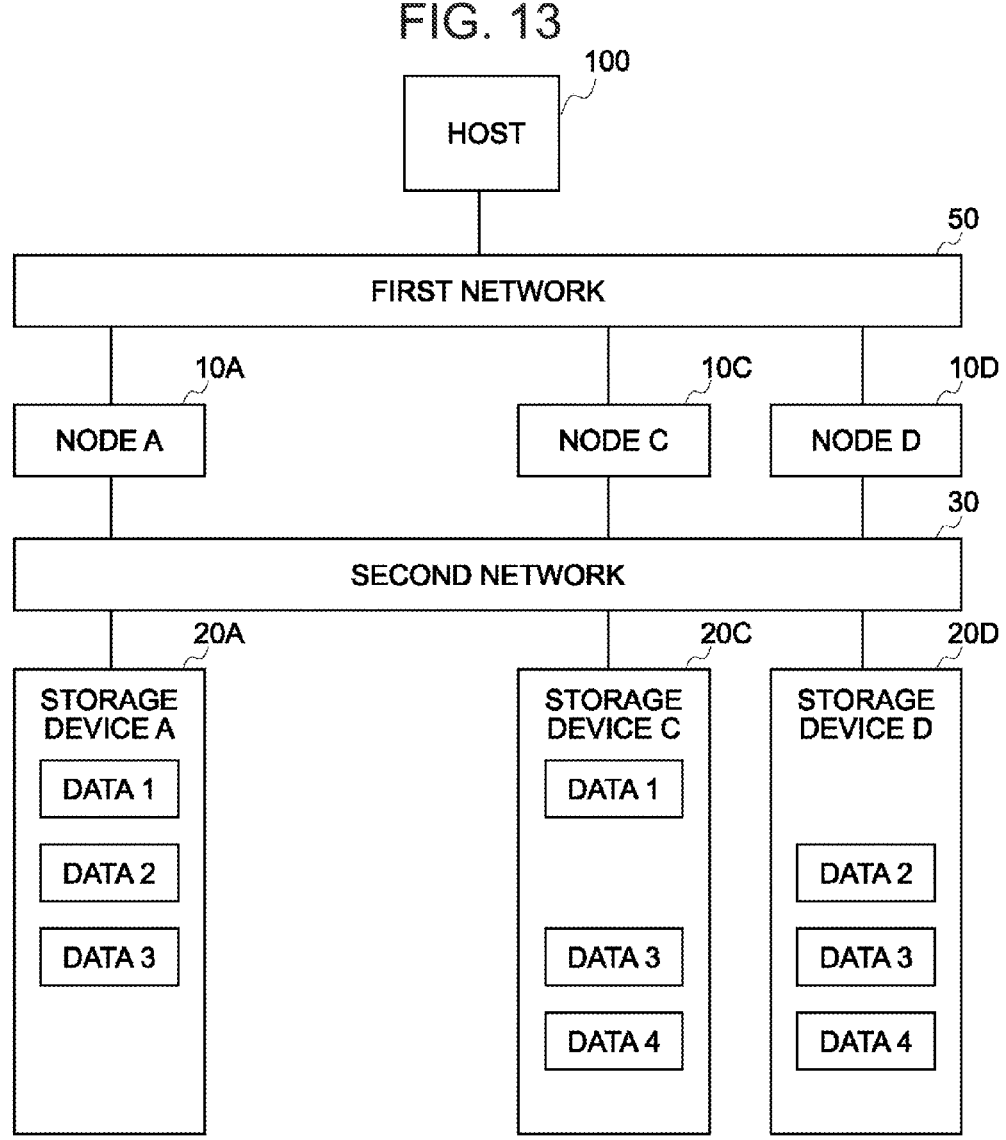

FIG. 15

| PATTERN ID | R1 | R2 | R3 | COPY |
|---|---|---|---|---|
| P1 | A | C | D' | REQUIRED |
| P2 | A | D | C' | REQUIRED |
| P3 | A | C | D | NOT-REQUIRED |
| P4 | C | D | C | NOT-REQUIRED |
| P5 | C | A | D' | REQUIRED |
| P6 | C | D | C | REQUIRED |
| P7 | C | A | A' | REQUIRED |
| P8 | D | D | D | NOT-REQUIRED |
| P9 | D | A | A | NOT-REQUIRED |
| P10 | D | C | A' | REQUIRED |
| P11 | D | A | C | NOT-REQUIRED |
| P12 | D | C | A | NOT-REQUIRED |

| PATTERN ID | R1 | R2 | R3 | NULL(R4) |
|---|---|---|---|---|
| P1 | A | B | C | D |
| P2 | A | B | D | C |
| P3 | A | C | B | D |
| P4 | A | C | D | B |
| P5 | A | D | B | C |
| P6 | A | D | C | B |
| P7 | B | A | C | D |
| P8 | B | A | D | C |
| P9 | B | C | A | D |
| P10 | B | C | D | A |
| P11 | B | D | A | C |
| P12 | B | D | C | A |
| P13 | C | A | B | D |
| P14 | C | A | D | B |
| P15 | C | B | A | D |
| P16 | C | B | D | A |
| P17 | C | D | A | B |
| P18 | C | D | B | A |
| P19 | D | A | B | C |
| P20 | D | A | C | B |
| P21 | D | B | A | C |
| P22 | D | B | C | A |
| P23 | D | C | A | B |
| P24 | D | C | B | A |

REPLICATION SYSTEM AND METHOD OF REBUILDING REPLICATION CONFIGURATION

CROSS-REFERENCE TO RELATED APPLICATIONS

This application is based upon and claims the benefit of priority of the prior Japanese Patent Application No. 2012-074089, filed on Mar. 28, 2012, the entire contents of which are incorporated herein by reference.

FIELD

The present invention relates to a replication system, a method of rebuilding replication configuration, and a non-transitory computer readable recording medium.

BACKGROUND

A system in which the same data is stored in a plurality of storage devices (which will hereinafter be referred to as a replication system) is known as a storage system. A configuration and functions of the existing replication system will hereinafter be described by use of FIGS. 1 through 4.

As schematically illustrated in FIG. 1, the existing replication system includes N number (N=4 in FIG. 1) of storage devices and N number of nodes which are connected to a host (host computer) via a network and each of which is connected to the storage device different from each other. Each node in this replication system is basically a computer which performs control (read/write access) with contents corresponding to a read/write request given from the host over the storage device connected to the self-node. Each node, however, in the case of receiving the write request of a certain item of data under a condition that a setting such as "Replication Number=3" is done, instructs a next node determined from a hash value etc. of identifying information of the data to store the data in the storage device. Then, the node receiving the write request and the two nodes receiving the instruction from another node store the same data in the three storage devices.

Further, the existing replication system also has a function of copying the data (which will hereinafter be termed a replication rebuilding function) so that the replication number of all the data becomes a setting value if a fault occurs in a certain storage device or a certain node.

To be specific, if the fault occurs in a node B or a storage device B of the replication system depicted in FIG. 1, as illustrated in FIG. 2, it follows that the replication Number of data 1, data 2, data 4 decreases down to "2".

In such a case, in the existing replication system, as schematically illustrated in FIG. 3, each node executes a process of reading a specified item of data stored in the storage device B out of the storage device of the self-node, and requesting another node to store the readout data in the storage device. Then, as depicted in FIG. 4, the replication system is returned to a status where the replication Number of all the data is "3".

PRIOR ART DOCUMENTS

Patent document 1: Japanese Patent Laid-Open No. 2005-353035
Patent document 2: Japanese Patent Laid-Open No. 2002-215554
Patent document 3: International Publication Pamphlet No. WO 08/114,441
Patent document 4: Japanese Patent Laid-Open No. 2011-95976

As apparent from the functions described above, the replication system is a system exhibiting high reliability and a high fault tolerant property.

In the existing replication system, however, when rebuilding a replication configuration (FIG. 3), a network for connecting a host to the system is used for transferring and receiving the data to be copied. Therefore, the existing replication system decreases in response speed to the read/write request given from the host while rebuilding the replication configuration.

SUMMARY

According to an aspect of the embodiments, a replication system includes: N number (N≥3) of storage devices; and N number of nodes, which are connected to a host via a first network and are connected to the N number of storage devices via a second network, each to receive a request for accessing a storage device among the N number of storage devices associated with itself and to have an access with a content in response to the received access request to the storage device, wherein when a node among the N number of nodes receives a write request of data from the host, each of M number (1<M<N) of nodes, among the N number of nodes, including the node stores the data in the storage device associated with itself, and if first data in a first storage device among the N number of storage devices cannot be read out, the first data stored in a storage device among the N number of storage devices is stored into a second storage device among the N number of storage devices not stored with the first data by transmitting the first data via the second network.

According to another aspect of the embodiments, a non-transitory computer readable recording medium recorded with a replication program for a replication system including: N number (N≥3) of storage devices; and N number of computers that are connected to a host via a first network and are connected to the N number of storage devices via a second network, the program being executed by each of the N number of computers to make the replication system function as a system comprising: a function of making each computer among the N number of computers receive from the host an access request to the storage device associated with the each computer and have an access with a content in response to the received access request to the storage device; a function of making, when a computer among the N number of computers receives a write request of data from the host, each of M number (1<M<N) of computers, among the N number of computers, including the computer store the data into the storage device associated with itself, and a function of making, if first data in a first storage device among the N number of storage devices cannot be read out, a computer associated with the first storage device store the first data stored in another storage device among the N number of storage devices into a second storage device among the N number of storage devices not stored with the first data by transmitting the first data via the second network.

According to still another aspect of the embodiments, a method of rebuilding a replication configuration in a replication system including: N number (N≥3) of storage devices; and N number of nodes, which are connected to a host via a first network and are connected to the N number of storage devices via a second network, each to receive a request for accessing a storage device among the N number of storage devices associated with itself and to have an access with a content in response to the received access request to the storage device, the method comprising: storing, if first data in a first storage device among the N number of storage devices cannot be read out, the first data stored in a storage device among the N number of storage devices into a second storage device among the N number of storage devices not stored with the first data by transmitting the first data via the second network.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 9 is an explanatory diagram of a cluster management table stored in each storage device according to the embodiment;

FIG. 10 is an explanatory diagram of statuses represented by items of information in the entry table and the cluster management table;

FIG. 11 is an explanatory diagram of a mapping pattern table provided in each node according to the embodiment;

FIG. 12 is an explanatory diagram of an allocation table provided in each node according to the embodiment;

FIG. 13 is an explanatory diagram of a status of the replication system in which a fault occurs in a single node or storage device;

FIG. 15 is an explanatory diagram of a process executed for the mapping pattern table when the fault occurs in the single node or storage device;

DESCRIPTION OF EMBODIMENTS

An in-depth description of one embodiment of the present invention will hereinafter be made with reference to the drawings. It should be noted that a configuration of the embodiment, which will hereinafter be discussed, is nothing more than an exemplification of the present invention, and the present invention is not limited to the configuration of the embodiment.

Figure 1:
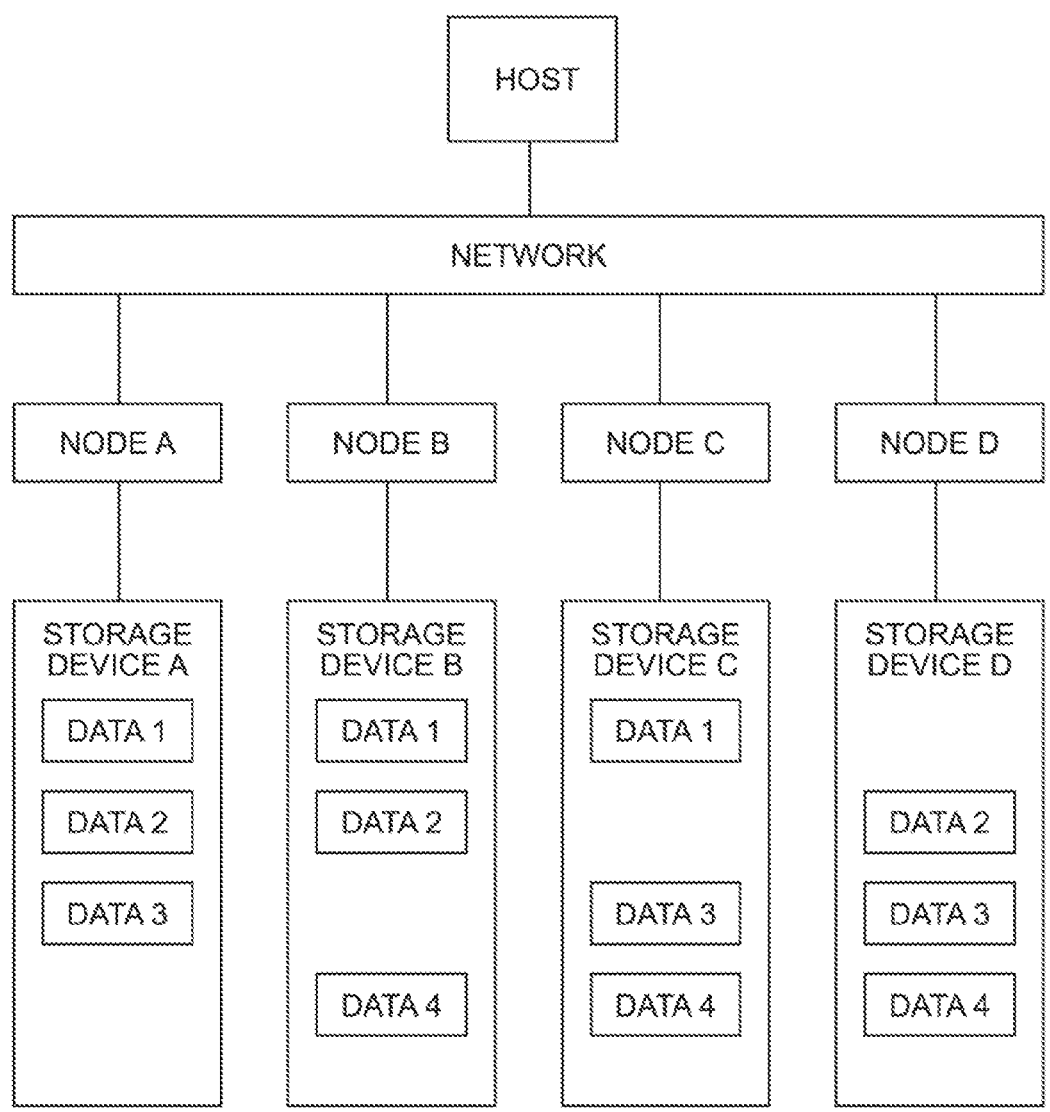
FIG. 1 is a diagram of a configuration of an existing replication system.
Figure 2:
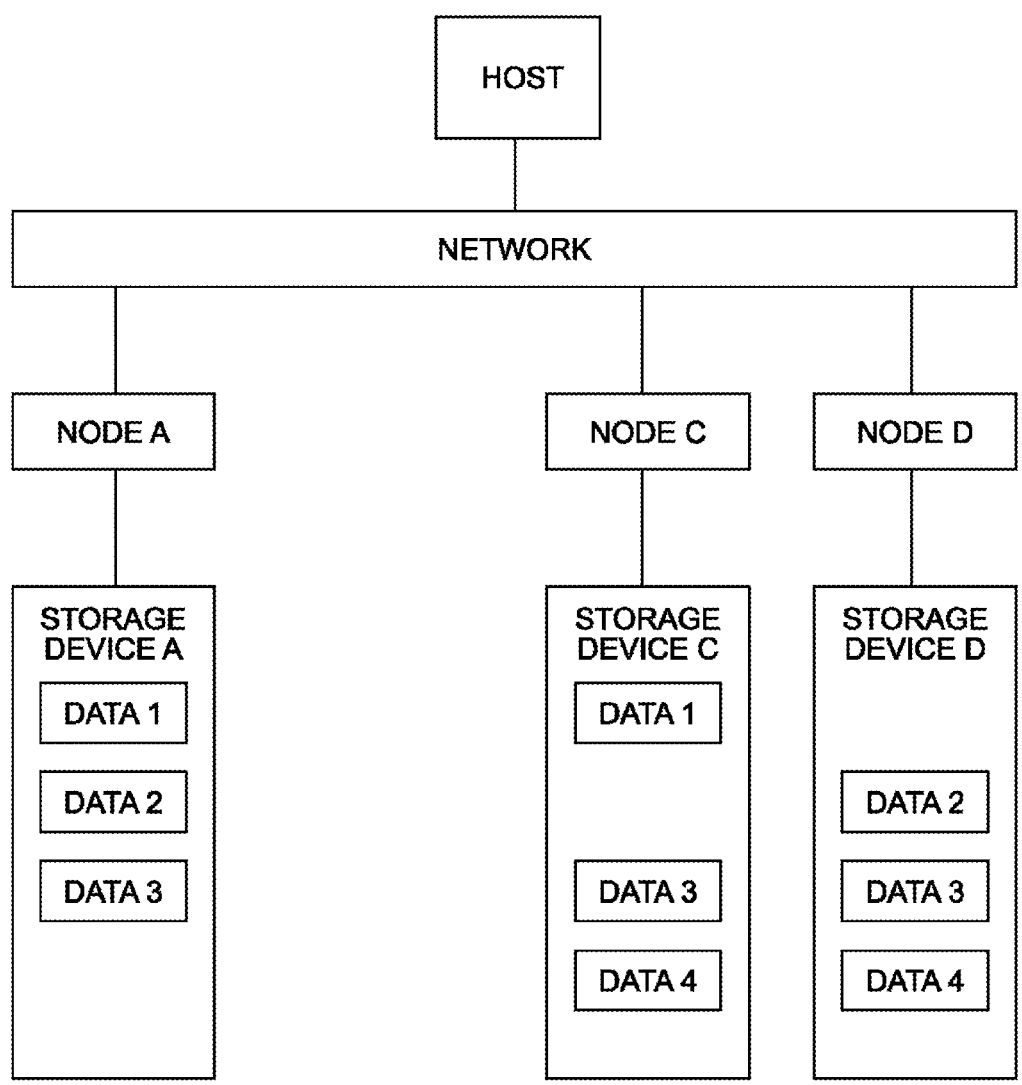
FIG. 2 is an explanatory diagram (part 1) of functions of the existing replication system.
Figure 3:
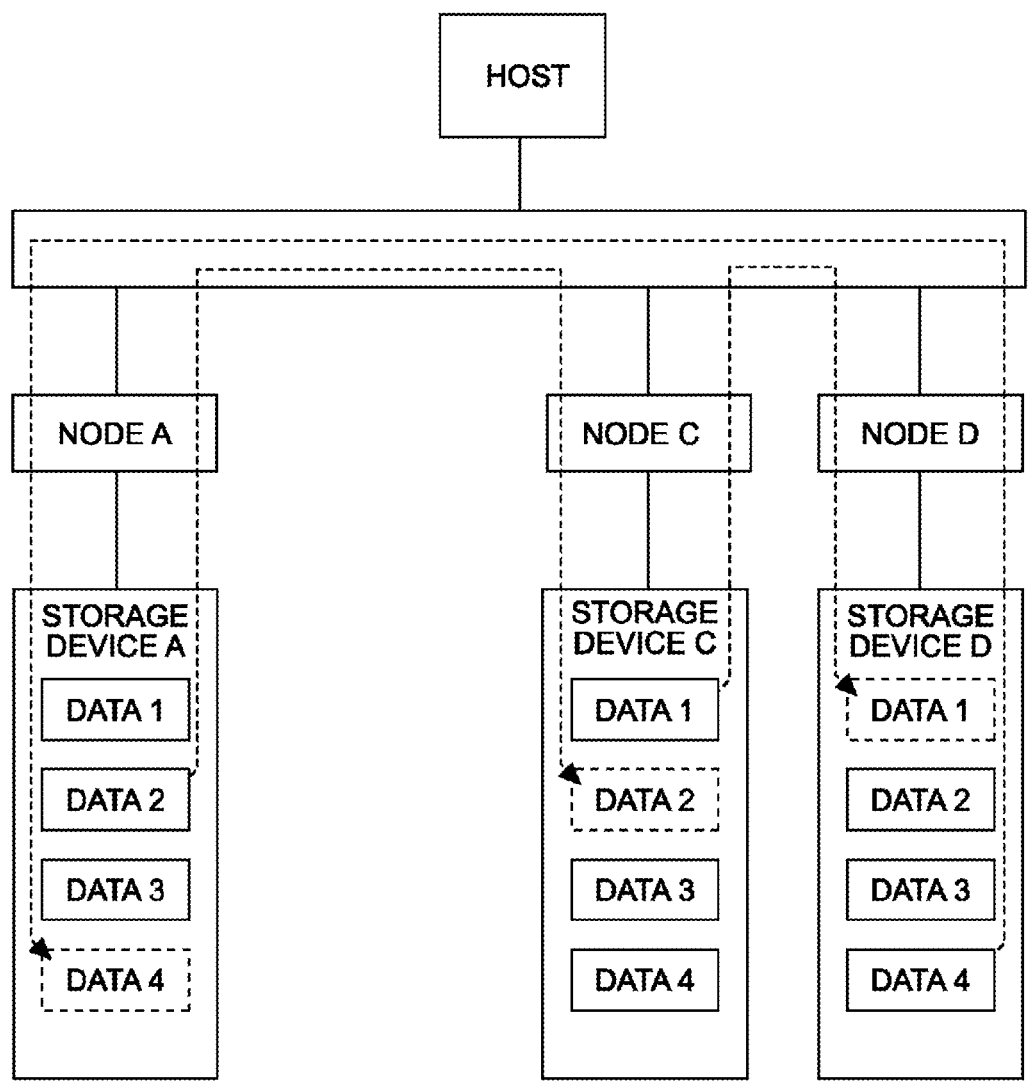
FIG. 3 is an explanatory diagram (part 2) of the functions of the existing replication system.
Figure 4:
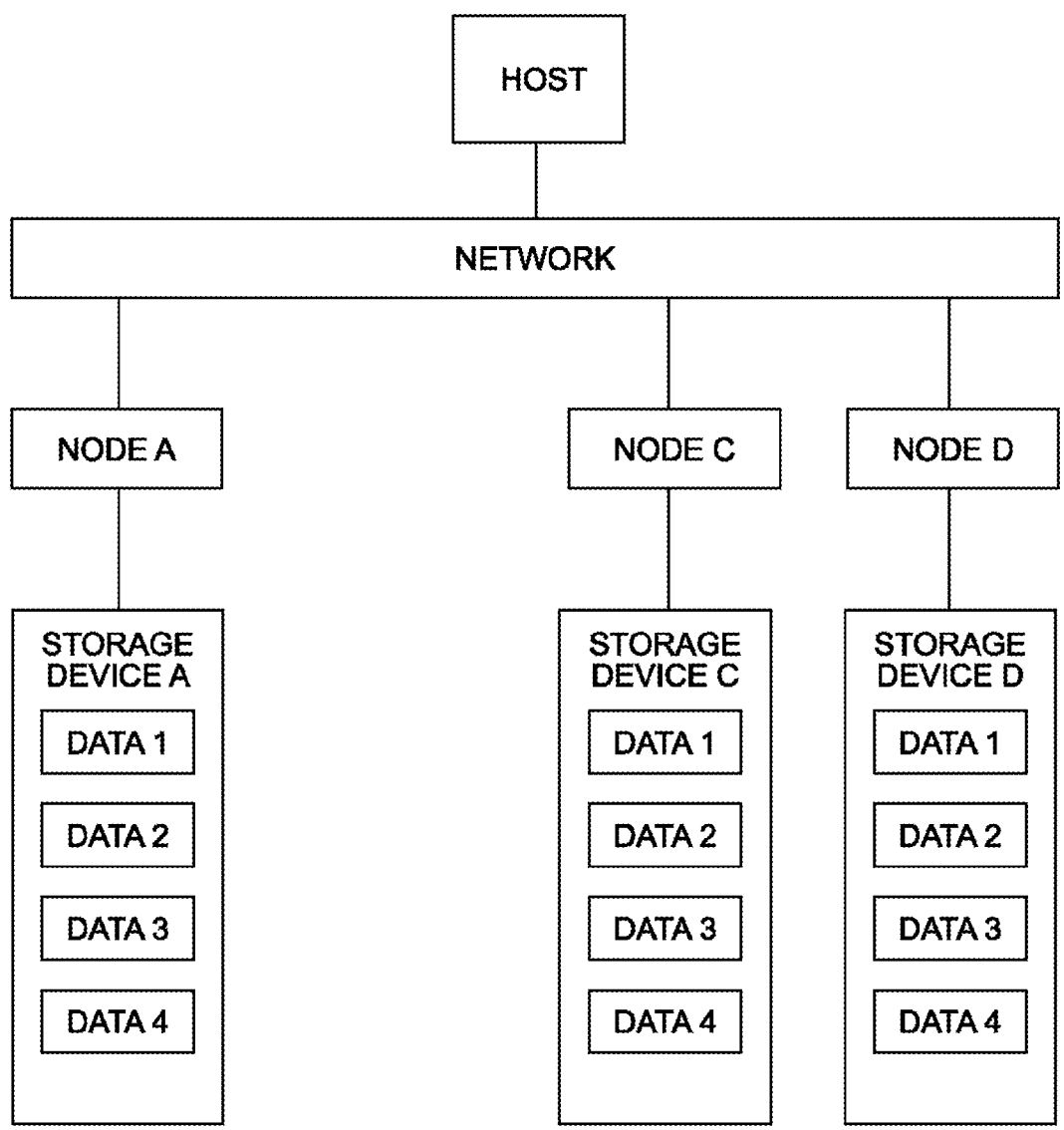
FIG. 4 is an explanatory diagram (part 3) of the functions of the existing replication system.
Figure 5:
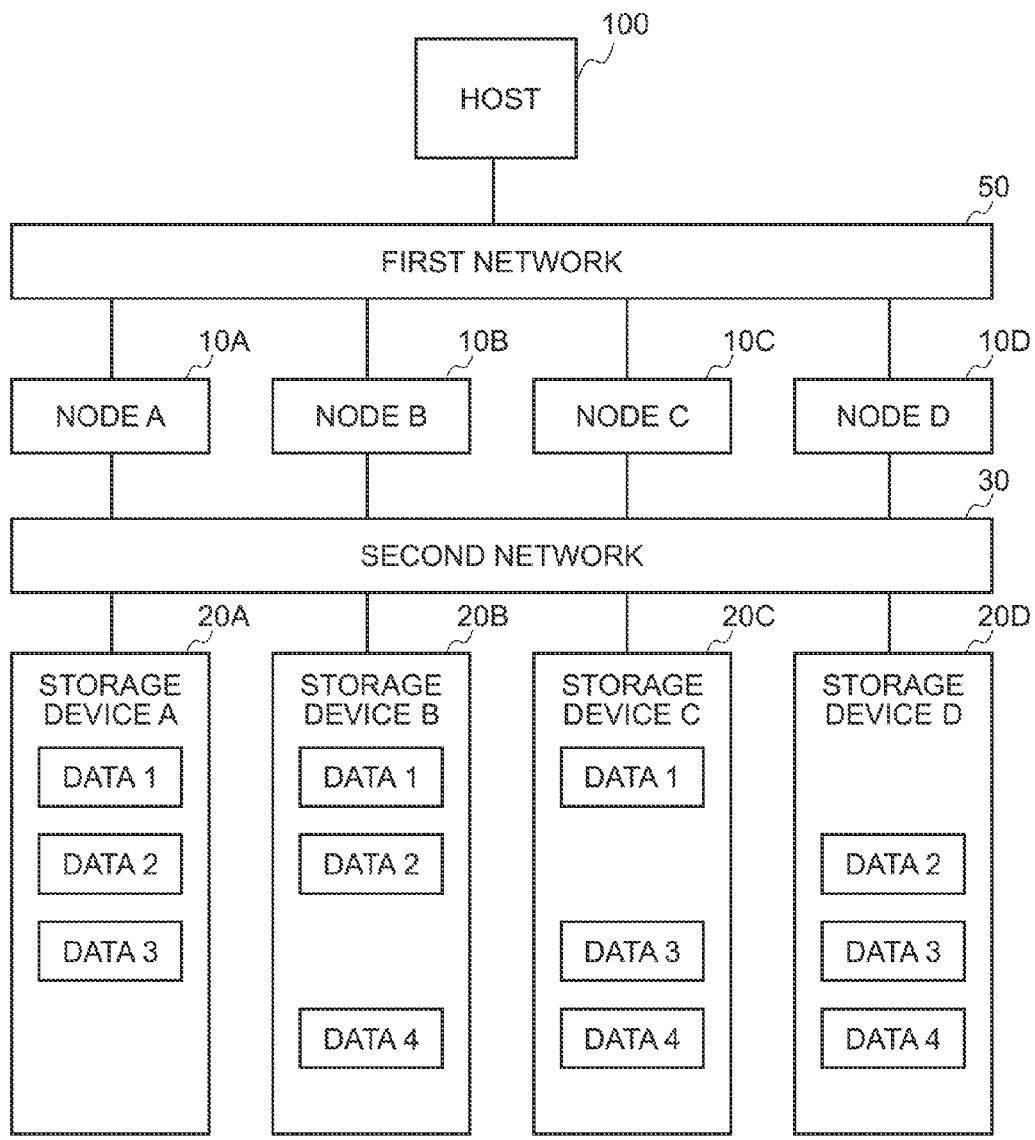
FIG. 5 is a diagram of a configuration of a replication system according to an embodiment.
Figure 6A:
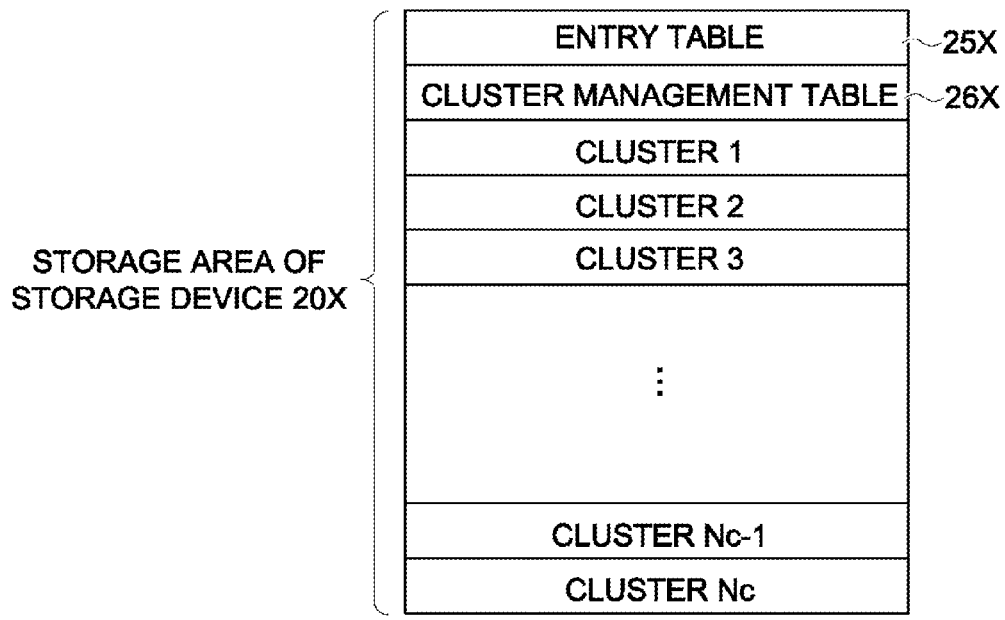
FIG. 6A is an explanatory diagram of a mode of how a storage area of each storage device included in the replication system according to the embodiment is used.
Figure 6B:
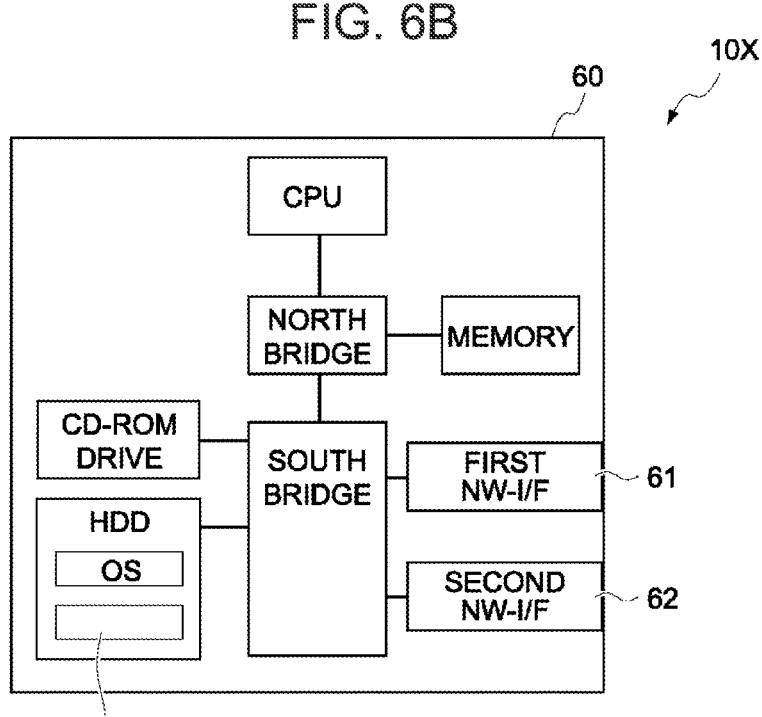
FIG. 6B is an explanatory diagram of a hardware configuration of each node in the replication system according to the embodiment.

To begin with, a replication system according to the embodiment will be outlined by use of FIGS. 5, 6A and 6B. Note that FIG. 5 among these drawings is a diagram of a configuration of the replication system according to the embodiment. FIG. 6A is an explanatory diagram of a mode of how a storage area of each of storage devices 30X (X=A–D) in the replication system is used (segmented); and FIG. 6B is an explanatory diagram of a hardware configuration of each node 10X in the replication system.

As illustrated in FIG. 5, the replication system according to the embodiment includes four nodes 10A-10D connected to a host 100 via a first network 50, four storage devices 20A-20D and a second network 30.

The first network 50 is a network (backbone network) which connects the host 100 and the four nodes 10A-10D to each other. This first network 50 (which will hereinafter be abbreviated to the first NW 50) involves exploiting the Internet itself and a network configured by combining a local area network on the side of the node 10 and the Internet.

A second network 30 is a network which connects the four nodes 10A-10D and the four storage devices 20A-20D to each other. This second network 30 (which will hereinafter be abbreviated to the second NW 30) involves using, e.g., a network configured by some number of SAS (Serial Attached SCSI (Small Computer System Interface)) expanders, and a fiber channel network.

Each storage device 20X (X=A–D) is a storage device (HDD (Hard Disk Drive) etc.) which includes a communication interface for the second NW 30. As schematically illustrated in FIG. 6A, the storage area of the storage device 20X is used as Nc number of clusters (storage areas each having a fixed length), an entry table 25X and a cluster management table 26X.

Each node 10X (X=A–D) is a device configured such that a computer 60 including, as illustrated in FIG. 6B, an interface circuit 61 for the first NW 50 and an interface circuit 62 for the second NW 30 is installed with an OS (Operating System), a replication program 18, etc. Note that the replication program 18 is a program executed by a CPU in the computer including two pieces of communication adaptors and thus making the computer operate as the node 10X having functions that will hereinafter be explained.

Each node 10X (FIG. 5) is basically a device which receives a read/write request with respect to the storage device 20X from the host 100 and gives a response to the received read/write request by controlling the storage device 20X.

Each node 10X has, however, a function of generating such a status that the same data ("data 1", "data 2", etc; which will hereinafter be also referred to as "extents") are stored in the three storage devices among the four storage devices 20A-20D. Further, each node 10X has a function of returning, if a fault occurs in a certain single node 10 or storage device 20, a replication number of the data (extent) in the system to "3".

Based on the premise of what has been discussed so far, the configuration and operations of the replication system according to the embodiment will hereinafter be described more specifically.

Figures 7, 8:
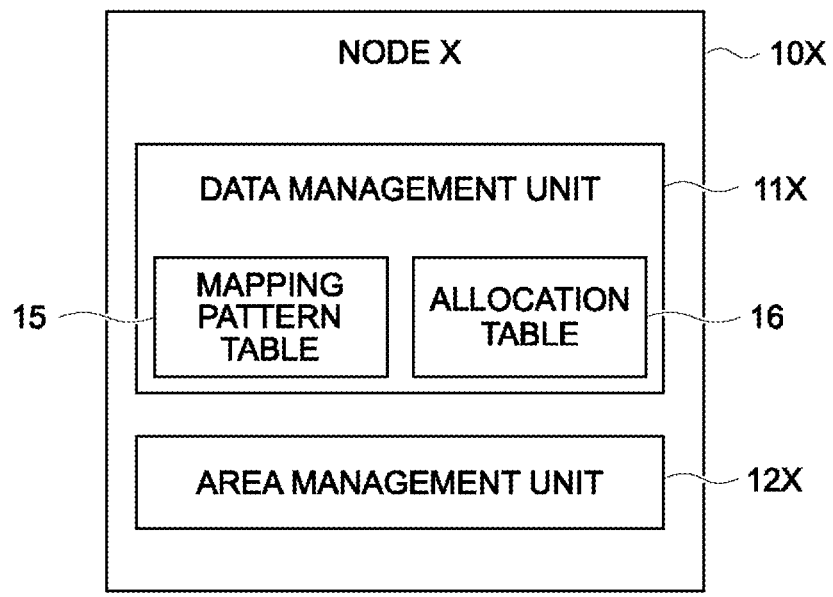
FIG. 7 is a block diagram of functions of each node included in the replication system according to the embodiment.
FIG. 8 is an explanatory diagram of an entry table stored in each storage device according to the embodiment.

FIG. 7 illustrates a block diagram of functions of the node 10X (X=A-D). As illustrated in FIG. 7, the node 10X is configured (programmed) to operate as the device including a data management unit 11X which retains a mapping pattern table 15 and an allocation table 16, and an area management unit 12X.

To start with, a function of the area management unit 12X will be explained.

The area management unit 12X is a unit (functional block) which receives a first request, a second request and write completion notification from the data management unit 11X within the self-node 10X, and receives the second request and the write completion notification from a data management unit 11Y in another node 10Y via the first NW 50.

The first request is a request which is transmitted to the area management unit 12X by the data management unit 11X receiving a readout request about a certain extent in the storage device 20X from the host 100 in order to obtain the area information on this extent. Note that in the description given above and in the following description, the phrase "the area information on a certain extent" connotes "the cluster number of one cluster that has already been stored/that will be stored with a certain extent" or "information on the cluster numbers, arranged in the sequence of using the clusters, of a plurality of clusters that have already been each stored/that will be each stored with a certain extent". Further, a key of the extent implies unique identifying information of the extent.

The readout request received by the data management unit 11X from the host 100 contains the key of the extent that should be read from the storage device 20X. The extent requested to be read from the host 100 through the readout request will be referred to as a read target extent. Further, the key of the readout target request (the key contained in the readout request) will be termed the readout target key.

The data management unit 11X receiving the readout request from the host 100 transmits the first request containing the readout target key in the received readout request to the area management unit 12X.

The area management unit 12X receiving the first request, at first, reads the cluster number associated with the readout target key in the received first request out of the entry table 25X.

FIG. 8 illustrates one example of the entry table 25X.

This entry table 25X is a table configured to receive an addition of a record containing settings (values) an extent key, an extent size and a cluster number of the cluster stored with header data of the extent when completing new writing to the storage device 20X of a certain extent. That is, the entry table 25X is the table stored with the records each containing, with respect to each of the extents already stored in the storage device 20X, key and size of the extent, cluster number of the cluster stored with the header data of the extent. Note that the header data of the extent are the data for one cluster from the header of the extent larger than a size of one cluster, or all of the data of the extent smaller than the size of one cluster.

The area management unit 12X, which reads the cluster number associated with the readout target key out of the entry table 25X, further reads a status value associated with the cluster number out of the cluster management table 26X.

As illustrated in FIG. 9, the cluster management table 26X is a table retaining the status values (values representing positive integers in the embodiment) about the respective clusters in the form of being associated with the cluster numbers of the clusters in the storage device 20X.

The following three types of values exist as the status values retained in the cluster management table 26X:

A status value "0" indicating that the associated cluster (having the cluster number associated with the self-status-value) is a yet-unused cluster (that is not yet used for storing the data;

Status values "1–N" defined as the cluster numbers themselves of the clusters stored with data subsequent to the data (a part of the extent) stored in the associated clusters; and A status value "END" indicating that the associated cluster is the cluster stored with the last data of the extent and being larger than Nc (=the maximum cluster number in the storage device 20X).

The area management unit 12X, which reads the status value satisfying the conditions given above out of the cluster management table 26X, determines whether or not the readout status value is the cluster number (any one of 1 to Nc) or "END" (the integer value larger than Nc).

If the status value readout of the cluster management table 26X is the cluster number, the area management unit 12X reads the status value associated with the same cluster number as the readout status value (cluster number) from the cluster management table 26X. The area management unit 12X iterates these processes till "END" is readout of the cluster management table 26X.

If "END" is read out of the cluster management table 26X, the area management unit 12X generates area information of the areas in which a series of cluster numbers read from the tables 25 and 26X are arranged in the reading sequence thereof.

To be specific, if the readout target key is "a," the cluster number "1" is read out from the entry table 25X (FIG. 8). Then, "2" is stored as the status value associated with the cluster "1" (specified by the cluster number "1"; the same applied hereinafter) in the cluster management table 26X depicted in FIG. 9. Further, the cluster management table 26X is stored with "4" as the status value associated with the cluster 2, "3" as the status value associated with the cluster 4 and "END" as the status value associated with the cluster 3. Accordingly, if the readout target key is a, the area management unit 12X generates the area information of the areas in which the cluster numbers 1, 2, 4, 3 are arranged in this sequence, i.e., the area information indicating that the extent a is, as schematically illustrated in FIG. 10, stored in the clusters 1, 2, 4, 3.

Further, the cluster number 6 is stored in the way of being associated with a key "b" in the entry table 25X depicted in FIG. 8. Then, "END" is stored as the status value associated with the cluster 6 in the cluster management table 26X illustrated in FIG. 9. Accordingly, if the readout target key is β, the area management unit 12X generates the area information containing only the cluster numbe r6, i.e., the area information indicating that the extent b is, as schematically illustrated in FIG. 10, stored in only the cluster 6.

The area management unit 12X, which generates the area information in the way described above, transmits (sends back) the generated area information to the data management unit 11X, and thereafter finishes the process for the received first request.

The second request is a request that is transmitted to the area management unit 12X in order to obtain, when there arises a necessity for the data management unit 11X or 11Y to write a certain extent into the storage device 20X, the area information on this extent (which will hereinafter be termed a writing target extent). This second request contains a writing target extent key (which will hereinafter be simply referred to as the writing target key) and a size thereof (which will hereinafter be referred to as the request size).

In the case of receiving the second request, the area management unit 12X, at the first onset, determines whether or not the same key as the writing target key in the received second request is registered (stored) in the entry table 25X.

As already explained, the entry table 25X (FIG. 8) receives the addition of the record containing the settings of the extent key, the extent size and the cluster number of the cluster stored with the header data of the extent when completing new writing to the storage device 20X of a certain extent. Therefore, if the same key as the writing target key is registered in the entry table 25X, it follows that the writing target extent is "an update extent having contents updated from the contents of the existing extent that has already existed in the storage device 20X". Further, whereas if the same key as the writing target key is not registered in the entry table 25X, it follows that the writing target extent is "a new extent that is not stored so far in the storage device 20X".

If the writing target extent is the new extent, the area management unit 12X, after executing an area information generating process of generating the area information on the writing target extent, gets stored inside with the generated area information and writing uncompleted area information containing the writing target key and the request size. Note that the phrase "getting stored inside" connotes "being stored in a storage area for the writing uncompleted area information on the memory (see FIG. 6B) in the node 10X".

The area information generating process is basically "a process of reading the cluster numbers of the yet-unused cluster, of which the number is enough to enable the data of the request size to be stored, from the cluster management table 26X, and generating the area information of the areas in which the readout cluster numbers are arranged in the reading sequence". The area information generating process is, however, a process of dealing with the clusters of which the cluster numbers are contained in the area information in the respective pieces of writing uncompleted area information, if some pieces of writing uncompleted area information exist within the area management unit 12X, not as the yet-unused clusters but as the clusters (of which the cluster numbers are not contained in the area information to be generated).

The cluster, of which the cluster number is contained in the area information to be generated by the area information generating process, is termed an allocation-enabled cluster. Namely, the cluster with "0" being set as the status value associated with the cluster number in the cluster management table 26X and of which the cluster number is contained in none of the writing uncompleted area information, is referred to as the allocation-enabled cluster.

The area management unit 12X executing the area information generating process and getting stored inside with the writing uncompleted area information, transmits the area information generated by the area information generating process to the sender (the data management unit 11X or 11Y) of the second request. Then, the area management unit 12X finishes the processes for the received second request.

While on the other hand, if the writing target extent is an update extent, the area management unit 12X at first reads the cluster number and the key each associated with the processing target key out of the entry table 25X. Subsequently, the area management unit 12X calculates the number of the clusters (which will hereinafter be termed a cluster Number) needed for storing the data having the size read from the entry table 25X and the number of the clusters (which will herein-after be termed a new cluster Number) needed for storing the data having the request size, and compares these cluster Numbers with each other.

If a relation such as "New Cluster Number Present Cluster Number" is established, the area management unit 12X reads the cluster numbers having the same cluster Number as the new cluster Number from the tables 25X and 26X in the same procedure as the procedure when making the response to the first request. In other words, the area management unit 12X reads the cluster numbers having the same cluster Number as the new cluster Number from the tables 25X and 26X in a different procedure from the procedure when making the response to the first request in terms of only a point of finishing reading out the cluster numbers (the status values) before reading out "END".

Subsequently, the area management unit 12X generates the area information of the areas in which the readout cluster numbers are arranged, and gets stored inside with the writing uncompleted area information containing the generated area information, the writing target key and the request size. Thereafter, the area management unit 12X transmits the generated area information to the sender (the data management unit 11X or 11Y) of the second request. Then, the area management unit 12X finishes the processes for the received second request.

If a relation such as "New Cluster Number>Present Cluster Number" is established, the area management unit 12X reads the cluster number (s) of one or more clusters stored with the extents identified by the writing target keys from the tables 25X and 26X in the same procedure as the procedure when making the response to the first request. Subsequently, the area management unit 12X specifies the cluster numbers of the allocation-enabled clusters having the same cluster Number as the Number given by "New Cluster Number—Present Cluster Number" on the basis of the information in the cluster management table 26 and the self-retained writing uncompleted area information.

The area management unit 12X, which specifies the cluster numbers of the allocation-enabled clusters having the cluster Number described above, generates the area information of the areas in which cluster number groups readout of the tables 25X and 26X and the newly specified cluster number groups are arranged. Subsequently, the area management unit 12X gets stored inside with the writing uncompleted area information containing the generated area information, the writing target key and the request size. Then, the area management unit 12X, after transmitting the generated area information to the sender of the second request, finishes the processes for the received second request.

Writing completion notification is notification that is transmitted by the data management unit 11 to the area management unit 12X after the data management unit 11 obtaining a certain piece of area information from the area management unit 12X by transmitting the second request has written the writing target extent to the cluster group, specified by the area information, in the storage device 20X. This writing completion notification contains a key (which will hereinafter be termed a writing completion key) of the writing target extent with the writing being completed.

The area management unit 12X receiving the writing completion notification, at first, searches for the writing uncompleted area information containing the same key as the writing completion key from within the pieces of self-retained writing uncompleted area information. Then, the area management unit 12X executes a table update process of updating the contents of the tables 25X and 26X into contents representing the status quo on the basis of the searched writing uncompleted area information.

Contents of this table update process will hereinafter be described. Note that in the following discussion, the key (=the writing completion key) and the size contained in the searched writing uncompleted area information are respectively referred to as a processing target key and a processing target size for the explanatory's sake. Moreover, a symbol "L" represents a total number of the cluster numbers in the area information contained in the searched writing uncompleted area information, and the n-th ($1 \leq n \leq L$) cluster number in the area information is notated by a cluster number #n.

The area management unit 12X starting the table update process determines, to begin with, whether the same key as the writing completion key is registered in the entry table 25X or not.

If the same key as the writing completion key is not registered in the entry table 25X, the area management unit 12X adds a record containing settings (values) of the processing target key, the processing target size and the cluster number #1 to the entry table 25X.

Subsequently, the area management unit 12X rewrites the status values associated with the cluster numbers #1-#L in the cluster management table 26X into the cluster numbers #2-#L and "END", respectively. More specifically, the area management unit 12X, when L=1, rewrites the status value associated with the cluster number #1 in the cluster management table 26X into "END". Further, the area management unit 12X, when L>1, rewrites the status values associated with the cluster number #1-#L−1 in the cluster management table 26X into the cluster numbers #2-#L, and further rewrites the status value associated with the cluster number #L in the cluster management table 26 into "END".

Then, the area management unit 12X discards the processed writing uncompleted area information (containing the same key as the writing completion key), and thereafter finishes the table update process.

Whereas if the same key as the writing completion key is registered in the entry table 25X, the area management unit 12X rewrites, after reading out the size associated with the writing completion key in the entry table 25X, this size in the entry table 25X into a processing target size. Note that if the readout size is coincident with the processing target size, the setting of not rewriting the size in the entry table 25X (not writing the same data) can be also done.

Subsequently, the area management unit 12X calculates the cluster Number (which will hereinafter be referred to as an old cluster Number) needed for storing the data having the size read from the entry table 25X and the cluster Number (which will hereinafter be referred to as the present cluster Number) needed for storing the data having the processing target size, and compares these cluster Numbers with each other.

If a relation such as "Old Cluster Number Present Cluster Number" is established, the area management unit 12X rewrites the status values associated with the cluster numbers #1-#L in the cluster management table 26X into the cluster numbers #2-#L and "END", respectively. Then, the area management unit 12X discards the processed writing uncompleted area information, and thereafter finishes the table update process.

If the relation such as "Old Cluster Number Present Cluster Number" is not established, the area management unit 12X also rewrites the status values associated with the cluster numbers #1-#L in the cluster management table 26X into the cluster numbers #2-#L and "END", respectively. In this case, however, the area management unit 12X rewrites, after reading out the status value associated with the cluster number #L, the status value into "END". Thereafter, the area management unit 12X repeats the processes of reading out the status value associated with the cluster number that is coincident with the readout status value and rewriting the status value into "0" till "END" is read out.

Then, when "END" is read out, the area management unit 12X finishes the table update process after discarding the processed writing uncompleted area information.

Functions of the data management unit 11X (X=A–D) will hereinafter be described.

The data management unit 11X (FIG. 5) is a unit (functional block) which receives a read/write request from the host 100 and receives an update request (its details will be explained later on) from another data management unit 11.

To start with, an operation of the data management unit 11X with respect to a readout request given from the host 100 will be described.

The readout request given from the host 100 contains an extent key (which will hereinafter be termed a readout target key) that should be read out. The data management unit 11X receiving a certain readout request transmits the first request containing the readout target key in this readout request to the area management unit 12X. Thereafter, the data management unit 11X stands by for the area information being transmitted back as the response information to the first request.

When the area information is transmitted back, the data management unit 11X reads the data in the cluster (see FIG. 10) identified by each of the cluster numbers in the area information out of the storage device 20X. Then, the data management unit 11X transmits the data linked with the readout data back to the host 100 and thereafter terminates the processes for the received readout request.

Next, operations of the data management units 11A-11D in response to the write request given from the host 100 will be explained.

Each of the data management units 11A-11D normally operates in a status of retaining the mapping pattern table 15 having contents as illustrated in FIG. 11 and the allocation table 16 having contents as depicted in FIG. 12 on the memory. Note that the word "normally" implies "a case where all of the nodes 10A-10D and the storage devices 20A-20D function normally".

That is, each data management unit 11X (X=A–D) normally retains "the mapping pattern table 15 stored with totally 24 ways of permutations of pieces of identifying information (A–D) in the four storage devices 20 (and/or the nodes 10) in the way of enabling the permutations to be identified by pattern identifiers (P1-P24)" (FIG. 11). Further, each data management unit 11X normally retains "the allocation table 16 for associating each range of hash values (based on, e.g., SHA (Secure Hash Algorithm)–1) with any one of the pattern identifiers P1-P24" (FIG. 12).

On the other hand, the write request given from the host 100 contains the key and the size of the extent (which will hereinafter be termed the writing target extent) that should be written into the storage device 20X.

The data management unit 11X receiving the write request from the host 100, at first, calculates the hash value of the writing target extent key contained in the write request, and searches for the pattern identifier associated with the calculated hash value from within the allocation table 16. Subsequently, the data management unit 11X reads a record containing the setting of the same pattern identifier as the searched pattern identifier out of the mapping pattern table 15. Note that the write request received by the data management unit 11X from the host 100 is, on this occasion, such a request that an R1 value (the value in an R1 field) of the record to be read out is coincident with the self-identifying-information.

Then, the data management unit 11X transmits an update request having the same content as that of the received write request via the first NW 50 to the data management unit 11Y in the node 10Y, which is identified by an R2 value in the readout record.

The data management unit 11Y receiving the update request calculates the hash value of the key contained in the update request, and searches for the pattern identifier associated with the calculated hash value from within the allocation table 16. Subsequently, the data management unit 11Y reads the record containing the setting of the same pattern identifier as the searched pattern identifier from within the mapping pattern table 15, and determines whether the self-identifier is coincident with the R2 value in the readout record or not.

If the self-identifier is coincident with the R2 value in the readout record, the data management unit 11Y transmits the update request having the same content as that of the received update request via the first NW 50 to the data management unit 11Z in the node 10Z, which is identified by an R3 value in the readout record.

The data management unit 11Z receiving the update request calculates the hash value of the key contained in the update request, and searches for the pattern identifier associated with the calculated hash value from within the allocation table 16. Subsequently, the data management unit 11Z reads the record containing the setting of the same pattern identifier as the searched pattern identifier from within the mapping pattern table 15, and determines whether the self-identifier is coincident with the R2 value in the readout record or not. Then, the self-identifier is not coincident with the R2 value in the readout record (in this case, "Z" is given as the R3 value), and hence the data management unit 11Z writes the data having the contents requested by the received update request to the storage device 20Z managed by the data management unit 11Z itself.

Namely, the data management unit 11Z acquires the area information from the area management unit 12Z by transmitting the second request, then writes the writing target extent to one or more clusters of the storage device 20Z, which are indicated by the acquired area information, and transmits writing completion notification to the area management unit 12Z.

Thereafter, the data management unit 11Z transmits ACK (Acknowledgment) as a response to the processed update request to the sender (which is the data management unit 11Y in this case) of the update request.

The data management unit 11Y receiving ACK as the response to the transmitted update request writes the data having the contents requested by the already-received update request to the storage device 20Y. Thereafter, the data management unit 11Y transmits ACK as the response to the processed update request to the sender (which is the data management unit 11X in this case) of the update request.

The data management unit 11X receiving ACK as the response to the transmitted update request writes the data having the contents requested by the write request received from the host 100 to the storage device 20X. Then, the data management unit 11X transmits ACK to the host 100 and finishes the processes for the received write request.

An operation of each node 10 in the case of being unable to read out the data in the single storage device 20 will hereinafter be described by exemplifying an instance that the data in the storage device 20B cannot be read out due to a fault occurring in the node 10B or the storage device 20B.

Note that in the following discussion, a third replication represents the data (extent) in the system, which is updated first when the write request is received by a certain node 10 from the host 100. A second replication represents the data in the system, which is updated second when the write request is received by a certain node 10 from the host 100; and a third replication represents the data in the system, which is updated last when the write request is received by a certain node 10 from the host 100. Moreover, the first through third storage devices denote the storage devices 20 stored with the first through third replications, and the first through third nodes denote the nodes 10 which read the data out of the first through third storage devices.

Figure 14:
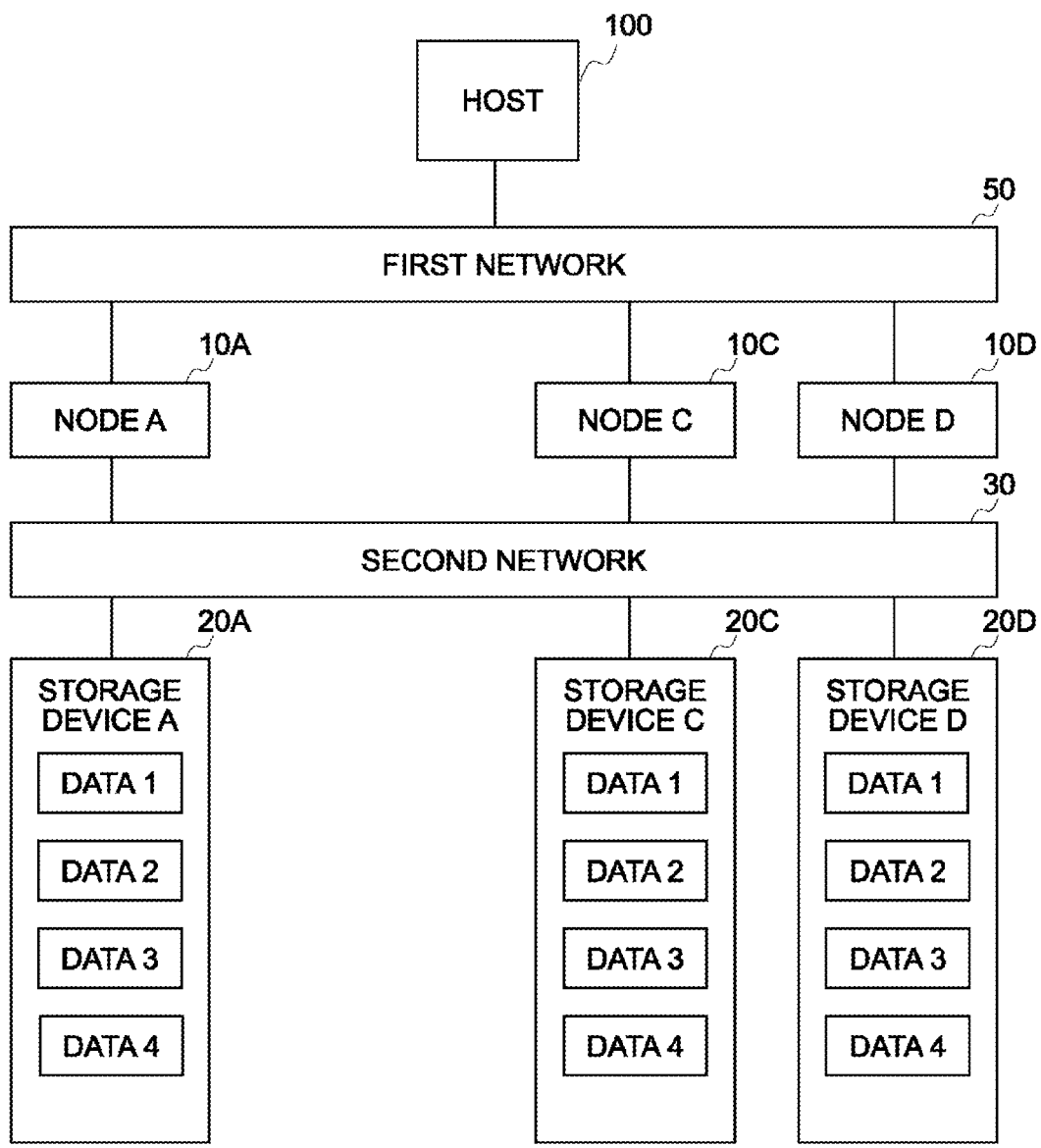
FIG. 14 is an explanatory diagram of a status of the replication system after rebuilding a replication configuration.

If the data cannot be read out of the storage device 20B, as schematically illustrated in FIG. 13, it follows that a replication Number of some pieces of data in the system becomes "2". Therefore, if the data cannot be read out of the storage device 20B, each node 10X (X=A, C, D) starts a replication configuration/reconfiguration process in order for the system status to become a status (the replication Number of each data is "3") as illustrated in FIG. 14.

Each node 10X starting the replication configuration/reconfiguration process, at first, obtains a mapping pattern table 15' having contents as depicted on the right side of FIG. 15 by processing the mapping pattern table 15.

To be specific, each node 10X generates the mapping pattern table 15' equivalent to what the mapping pattern table 15 undergoes sequentially the following processes (1)-(4).

(1) A process of erasing the identifying information "B" of the storage device 20 (or the node 10) with the occurrence of the fault from the mapping pattern table 15 and shifting leftward one through three pieces of identifying information positioned closer to the right side than "B".

(2) A process of adding information (items of information with double quotation marks " " such as "required" and "D" in FIG. 15) indicating a necessity for "the second node to copy the second replication to the third storage device" (details thereof will be described later on) to each record with "B" not being an R4 value.

(3) A process of degenerating (shrinking and simplifying) two records in which the R1 value to R3 value are equalized as a result of the process (1) down to one record.

(4) A process of reallocating the pattern identifier to each record.

Figure 16:
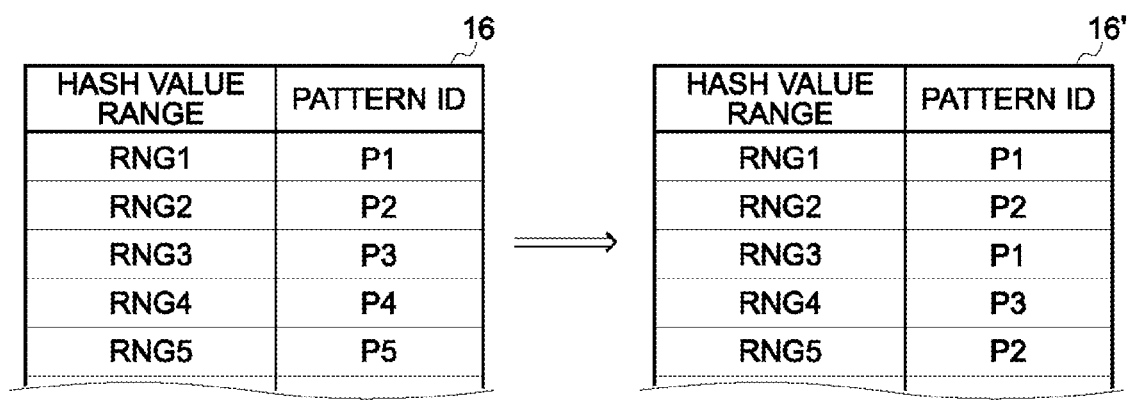
FIG. 16 is an explanatory diagram of a process executed for the allocation table when the fault occurs in the single node or storage device.

Further, each node 10X also executes a process of changing the allocation table 16 into an allocation table 16' having contents as illustrated in FIG. 16. That is, each node 10X executes a process of changing the allocation table 16 into the allocation table 16' in which the pattern identifiers of the post-degenerating records are associated with the ranges of the hash values associated so far with (the pattern identifiers of) the respective records in the degenerated mapping pattern table 15 (15').

Then, each of the second nodes executes a copy process of copying the second replication in the second storage device, which needs copying to the third storage device, to within the third storage device via the second NW 30 on the basis of the items of information in the mapping pattern table 15' and in the allocation table 16'.

To be specific, the data management unit 11A executes the copy process of copying the second replication in the storage device 20A, which needs copying to the storage device 20C, to the storage device 20C via the second NW 30. Moreover, the data management unit 11A executes also the copy process of copying the second replication in the storage device 20A, which needs copying to the storage device 20D, to the storage device 20D via the second NW 30.

Further, the data management unit 11C executes the copy process of copying the second replication in the storage device 20C, which needs copying to the storage device 20A, to the storage device 20A via the second NW 30. Furthermore, the data management unit 11C executes also the copy process of copying the second replication in the storage device 20C which needs copying to the storage device 20D, to the storage device 20D via the second NW 30.

Similarly, the data management unit 11D executes the copy process of copying the second replication in the storage device 20D, which needs copying to the storage device 20A, to the storage device 20A via the second NW 30 and also the copy process of copying the second replication in the storage device 20A, which needs copying to the storage device 20C, to the storage device 20C via the second NW 30.

The copy process executed by each data management unit 11X (X=A–D) is essentially the same having the same contents. Therefore, the following description will be made about only the contents of the copy process of copying the second replication in the storage device 20C, which needs copying to the storage device 20D, to the storage device 20D via the second NW 30, this copy process being executed by the data management unit 11C in the node 10C.

Figure 17:
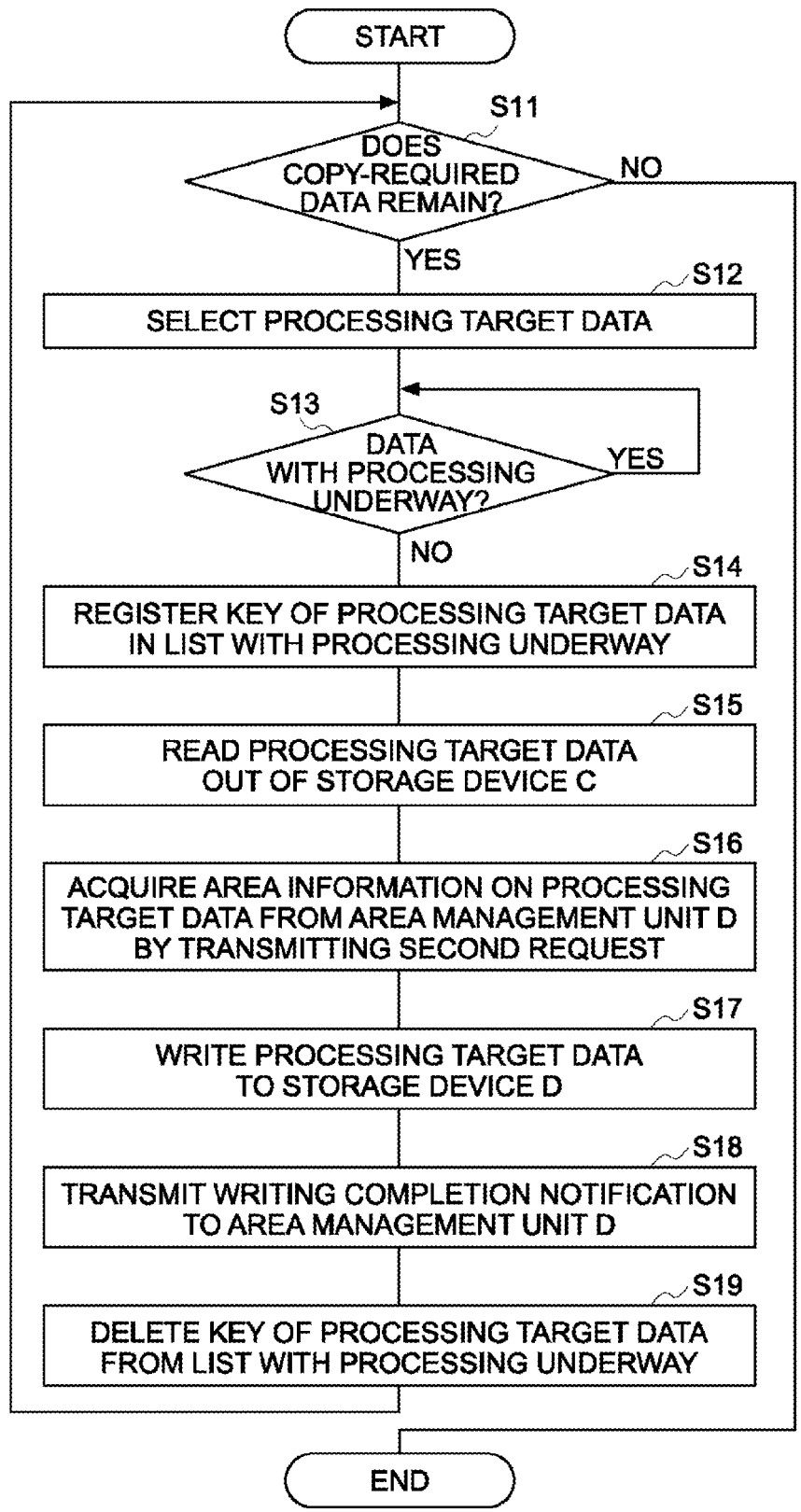
FIG. 17 is a flowchart of a copy process executed by a data management unit.
Figure 18:
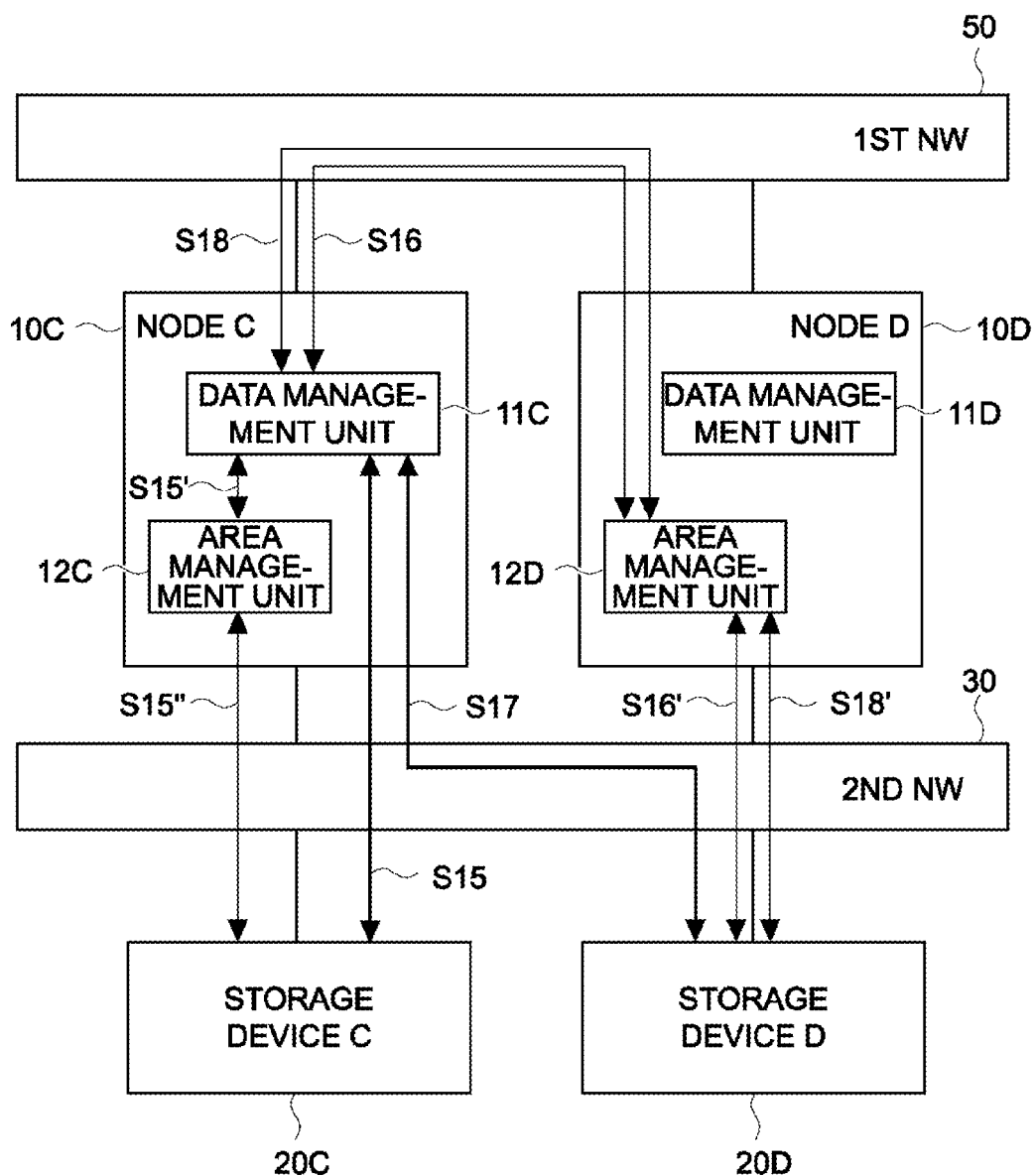
FIG. 18 is an explanatory diagram of the copy process in FIG. 17.

FIG. 17 illustrates a flowchart of how the data management unit 11C executes the copy process of copying the second replication in the storage device 20C, which needs copying to the storage device 20D, to the storage device 20D via the second NW 30. Further, FIG. 18 depicts a procedure of transferring and receiving the information between the respective units when in this copy process.

As illustrated in FIG. 17, the data management unit 11C starting this copy process, at first, determines whether or not the second replication (which is the copy-required data in FIG. 17), which needs copying to the storage device 20D, remains in the storage device 20C (step S11). The cop process explained herein is the process of copying the second replication in the storage device 20C, which needs copying to the storage device 20D, to the storage device 20D via the second NW 30, i.e., the process of copying the data in the second storage device, from which to determine the first through third storage devices according to the top record (in the first row) of the mapping pattern table 15'. Accordingly, in step S11, it is determined from the hash value of the key thereof and from the allocation table 16' whether there exists the data associated with the pattern identifier P1 or not.

If the copy-required data remains in the storage device 20C (step S11; YES), the data management unit 11C selects one piece of copy-required data as the processing target data (step S12). Then, the data management unit 11X determines whether or not the processing target data is the data with processing underway, of which the key is registered in the list with processing underway (step S13). Herein, the list with processing underway represents the list in which the key of the processing target data is registered when processing in step S14 and when processing in step S22 in FIG. 20 that will be explained later on.

If the selected processing target data is the data with processing underway (step S13; YES), the data management unit 11C stands by for the processing target data not becoming the data with processing underway (step S13; NO). Then, the data management unit 11C, when the processing target data is not the data with processing underway (step S13; NO), registers the key of the processing target data in the list with processing underway (step S14).

Further, the data management unit 11X, if the processing target data is not the data with processing underway from the beginning (step S13; NO), promptly executes a process in step S14.

The data management unit 11C finishing the process in step S14 reads the processing target data from the storage device 20C (step S15). Note that as already explained, the data management unit 11C acquires, from the area management unit 12C, the area information required for storing the processing target data in the storage device 20C. Accordingly, before the execution of step S15, the data management unit 11C, schematically illustrated in FIG. 18, transmits the first request to the area management unit 12C (step S15'). Further, the area management unit 12C receiving the first request generates the area information by accessing the storage device 20C (step S15") and sends the area information back to the data management unit 11C (step S15').

The data management unit 11C finishing the process in step S15 transmits the second request containing the key and the size of the processing target data via the first NW 50, thereby acquiring the area information on the processing target data from an area management unit 12D (FIGS. 17, 18; step S16). Note that the area management unit 12D receiving the second request generates the area information by accessing the storage device 20D (FIG. 18; step S16') and sends the area information back to the data management unit 11C (step S16).

Thereafter, the data management unit 11C writes the processing target data into the storage device 20D via the second NW 30 by use of the area information acquired from the area management unit 12D (FIGS. 17, 18; step S17).

The data management unit 11C completing the writing of the processing target data transmits the writing completion notification via the first NW 50 to the area management unit 12D (step S18).

The area management unit 12D receiving the writing completion notification updates the tables 25D and 26D within the storage device 20D (FIG. 18; step S18'). Note that the processing target data written to the storage device 20C by the data management unit 11C is normally the data that does not exist so far in the storage device 20C. Accordingly, in step S18', the record about the processing target data is added to the entry table 25D, and some number of status values are rewritten from "0" into values excluding "0" in the cluster management table 26D.

The data management unit 11C finishing the process in step S18 (FIG. 17), after deleting the key of the processing target data from the list with processing underway (step S19), loops back to step S11 and determines whether the copy-required data remains or not.

The data management unit 11C iterates these processes till the copy-required data disappear. Then, the data management unit 11C, when the copy-required data disappear (step S11; NO), updates the contents of the mapping pattern table 15' into those indicating that the copy related to the pattern identifier P1 is completed, and notifies the data management unit 11 in another node 10 that the copy related to the pattern identifier P1 is completed. Then, the data management unit 11C finishes this copy process.

Described next are operations of the respective units in the case of, before completing the copy process having the contents described above, transmitting the update request (write request) about the existing extent with the key hash value falling within RNG1 (FIG. 16) to the node 10A from the host 100.

Figure 19:
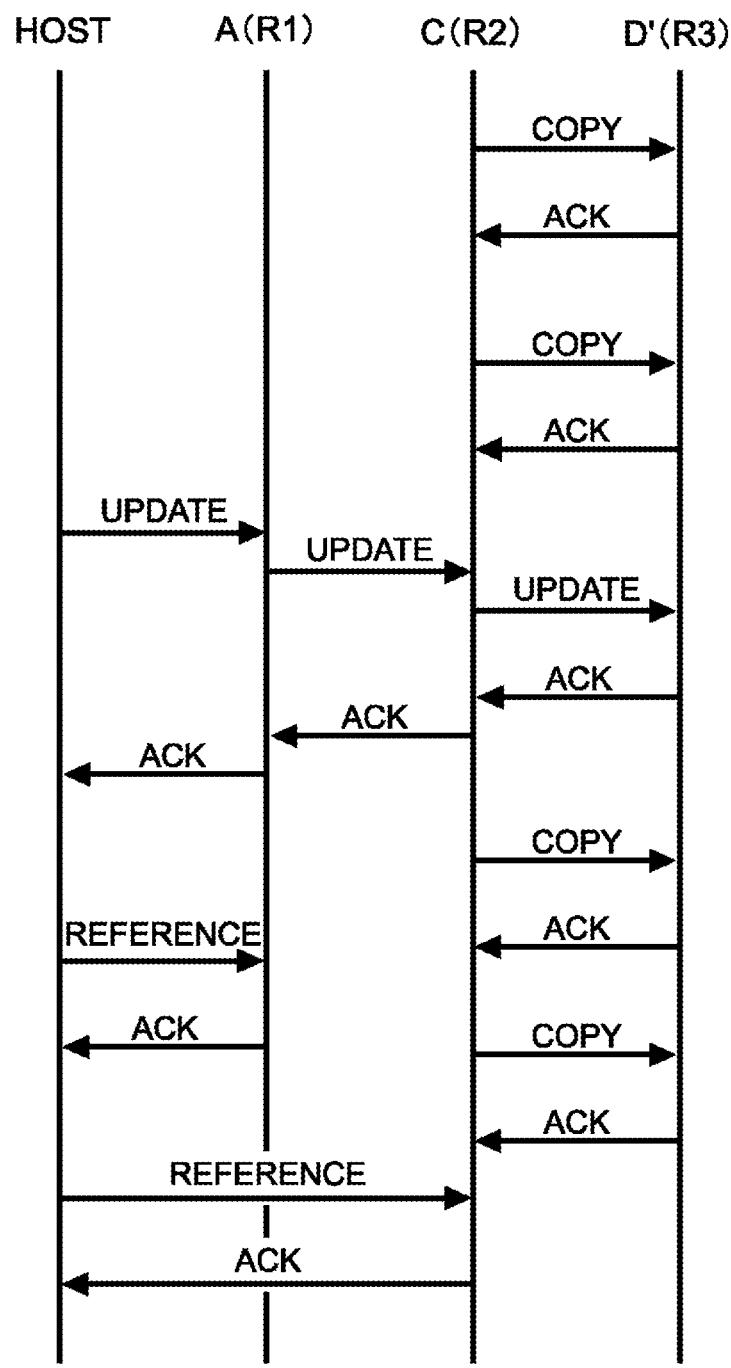
FIG. 19 is a sequence diagram illustrating a procedure of transferring and receiving information between nodes in a case where an update request is transmitted before completing the copy process.

In this case, the data management unit 11A receiving the update request reads the record containing pattern identifier P1 from the mapping pattern table 15' (FIG. 15) because the pattern identifier associated with the hash value of the key of the update target extent is P1. Then, the R2 value in this record is "C", and hence, as illustrated in FIG. 19, the data management unit 11A ("A(R1)") transmits the update request having the same contents as those of the received update request to the data management unit 11C ("C(R2)").

The data management unit 11C receiving the update request grasps from the allocation table 16', the mapping pattern table 15' and the update target extent key that the received update request should be transmitted to the data management unit 11D. Then, the data management unit 11C starts, because of being in the midst of executing the copy process to the data management unit 11D, the processes in the procedure depicted in FIG. 20, and determines at first whether the update target data is the data with processing underway or not (step S21).

If the update target data is the data with processing underway (step S21; YES), the data management unit 11C stands by for the update target data not becoming the data with processing underway (step S21; NO). Then, the data management unit 11C, when the update target data not becoming the data with processing underway (step S21; NO), registers the key of the update target data in the list with processing underway (step S22).

Further, the data management unit 11C, if the update target data is not the data with processing underway from the beginning (step S21; NO), promptly executes a process in step S22.

Figure 20:
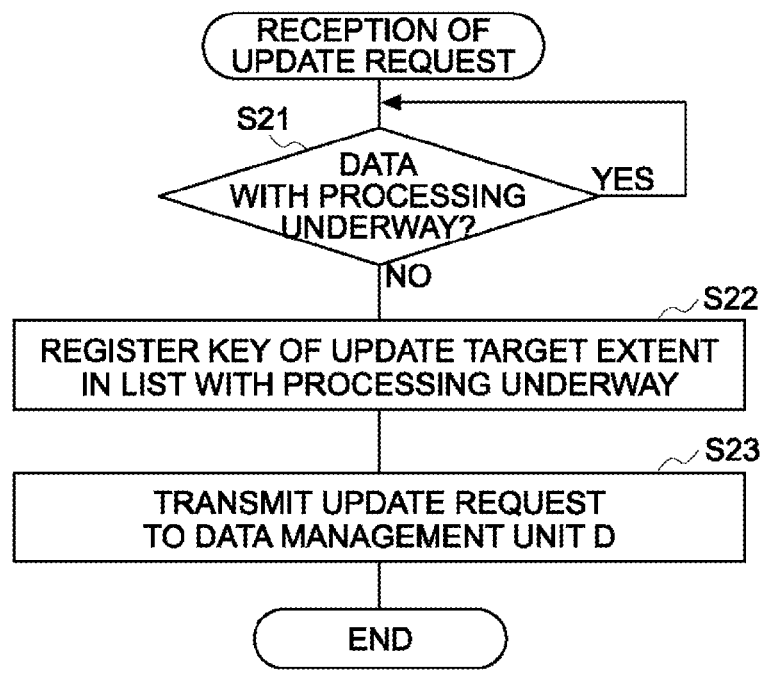
FIG. 20 is a flowchart of processes executed in the case of receiving the update request when execution of the copy process is underway.

The data management unit 11C finishing the process in step S22 transmits the update request to the data management unit 11D in the node 10D (step S23), and thereafter terminates the processes in FIG. 20.

The data management unit 11D receiving the update request from the data management unit 11C grasps from the allocation table 16', the mapping pattern table 15' and the update target extent key that the self-node 10C is a third node having no necessity for transmitting the update request to other nodes. Then, the data management unit 11D writes the update target extent into the storage device 20C by exploiting the area management unit 12D, and transmits ACK to the data management unit 11C.

Figure 21:
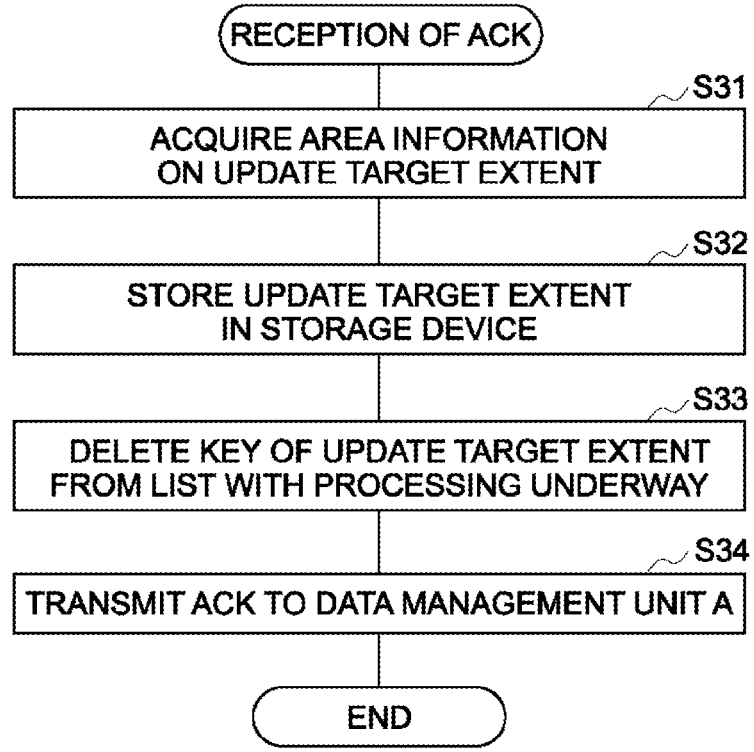
FIG. 21 is a flowchart of processes executed when receiving ACK.

The data management unit 11C receiving ACK starts the processes in the procedure illustrated in FIG. 21 and acquires at first the area information about the update target data from the area management unit 12D (step S31). Subsequently, the data management unit 11C writes the update target extent into the storage device 20C by use of the acquired area information (step S32). Thereafter, the data management unit 11C deletes the update target extent key from the list with processing underway (step S33). Then, the data management unit 11C transmits ACK to the data management unit 11A (step S34), and thereafter finishes the processes in FIG. 21.

As explained above, the replication system according to the embodiment has the configuration that if disabled from reading the data in a certain storage device 20, the data in another storage device 20 is transferred and received via the second NW 30, thereby copying the data to the storage device 20 as the coping destination device. It therefore follows that the replication system according to the embodiment can restructure the replication configuration without consuming the band of the first NW 50 between the host 100 and the system.

Modified Example

The replication system according to the embodiment discussed above can be modified in a variety of forms. For example, the replication system according to the embodiment can be modified into "a system configured so that the node 10X reads the data, which should be copied into the storage device 20Y, out of the storage device 20X, the write request of this data is transmitted to the node 10Y via the second NW 30, and the node Y processes the write request, thereby storing the data in the storage device 20Y". When the replication system is modified into the system such as this, however, it follows that the system is attained, which has a larger quantity of data transferred and received via the second NW 30 than by the replication system described above. It is therefore preferable to adopt the configuration (that the node 10X reading the data out of the storage device 20X writes the data in the storage device 20Y ($^1$X) described above.

The replication system according to the embodiment can be also modified into a system configured so that the second request and the writing completion notification are transmitted from the data management unit 11X to the area management unit 12Y via the data management unit 11Y. Further, the replication system according to the embodiment can be also modified into a system configured so that the arrangement of the replications can be determined by an algorithm different from those described above. Still further, it is a matter of course that the replication system according to the embodiment can be modified into a system in which the replication Number is not "3" and a system in which neither the number of the nodes 10 nor the number of the storage devices 20 is "4".

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments) of the present invention have been described in detail, it should be understood that the various changes, substitutions, and alterations could be made hereto without departing from the spirit and scope of the invention.

What is claimed is:

1. A replication system comprising:
N number (N≥3) of storage devices; and
N number of nodes, which are connected to a host via a first network and are connected to the N number of storage devices via a second network, each to receive a request for accessing a storage device among the N number of storage devices associated with itself and to have an access with a content in response to the received access request to the storage device,
each node comprising a first mapping pattern table and a first allocation table, the first mapping pattern table stores all permutations of pieces of identifying information in the storage devices enabling the permutations to be identified by pattern identifiers, the first allocation table associates ranges of hash values with any one of the pattern identifiers,
wherein when a node among the N number of nodes receives a write request of data from the host, each of M number (1<M<N) of nodes, among the N number of nodes, including the node stores the data in the storage device associated with itself, each node executes a replication based on a calculated hash value of a writing target extent key contained in the write request, the first allocation table and the first mapping pattern table, each node writes a file based on the calculated hash value, and when first data in a first storage device among the N number of storage devices cannot be read, the first data stored in a storage device among the N number of storage devices is stored into a second storage device among the N number of storage devices not stored with the first data by transmitting the first data via the second network, when the first data cannot be read, each node starts a replication process to generate a replication comprising
each node generating a second mapping pattern table that is equivalent to the first mapping pattern table;
each node changing the first allocation table into a second allocation table; and
second nodes copying the replication in the second storage device to a third storage device via the second network based on the second mapping pattern table and the second allocation table.

2. The replication system according to claim 1, wherein each of the N number of nodes has a function of reading the same data as the data, which cannot be read out of a certain storage device, from the storage device associated with itself, requesting a node associated with a storage destination device defined as a storage device that should get stored with the readout data to allocate a storage area for the readout data and storing the readout data in the allocated storage area of the storage destination device by use of the second network, and also a function of allocating, when requested by another node to allocate a storage area for a certain piece of data, the storage area for the data to the storage device associated with itself.

3. A non-transitory computer readable recording medium recorded with a replication program for a replication system including: N number (N≥3) of storage devices; and N number of computers that are connected to a host via a first network and are connected to the N number of storage devices via a second network, the program being executed by each of the N number of computers to make the replication system function as a system comprising:

a function of making each computer among the N number of computers receive from the host an access request to the storage device associated with the each computer and have an access with a content in response to the received access request to the storage device, each node comprising a first mapping pattern table and a first allocation table, the first mapping pattern table stores all permutations of pieces of identifying information in the storage devices enabling the permutations to be identified by pattern identifiers, the first allocation table associates ranges of hash values with any one of the pattern identifiers, a function of making, when a computer among the N number of computers receives a write request of data from the host, each of M number (1<M<N) of computers, among the N number of computers, including the computer store the data into the storage device associated with itself, each node executes a replication based on a calculated hash value of a writing target extent key contained in the write request, the first allocation table and the first mapping pattern table, each node writes a file based on the calculated hash value, and a function of making, when first data in a first storage device among the N number of storage devices cannot be read out, a computer associated with the first storage device store the first data stored in another storage device among the N number of storage devices into a second storage device among the N number of storage devices not stored with the first data by transmitting the first data via the second network, when the first data cannot be read, each node starts a replication process to generate a replication comprising
each node generating a second mapping pattern table that is equivalent to the first mapping pattern table;
each node changing the first allocation table into a second allocation table; and
second nodes copying the replication in the second storage device to a third storage device via the second network based on the second mapping pattern table and the second allocation table.

4. The non-transitory computer readable recording medium according to claim 3, wherein the replication program makes the replication system function as a system enabling each computer to execute:

a process of reading the same data as the data, which cannot be read out of a certain storage device, from the storage device associated with itself, requesting a computer among N number of computers associated with a storage destination device defined as a storage device that should get stored with the readout data to allocate a storage area for the readout data and storing the readout data in the allocated storage area of the storage destination device by use of the second network; and a process of allocating, when requested by another computer to allocate a storage area for a certain piece of data, the storage area for the data to the storage device associated with itself.

5. A method of rebuilding a replication configuration in a replication system including: N number (N≥3) of storage devices; and N number of nodes, which are connected to a host via a first network and are connected to the N number of storage devices via a second network, each to receive a request for accessing a storage device among the N number of storage devices associated with itself and to have an access with a content in response to the received access request to the storage device, each node comprising a first mapping pattern table and a first allocation table, the first mapping pattern table stores all permutations of pieces of identifying information in the storage devices enabling the permutations to be identified by pattern identifiers, the first allocation table associates ranges of hash values with any one of the pattern identifiers, each node executes a replication based on a calculated hash value of a writing target extent key contained in the write request, the first allocation table and the first mapping pattern table, each node writes a file based on the calculated hash value, the method comprising:

storing, when first data in a first storage device among the N number of storage devices cannot be read, the first data stored in a storage device among the N number of storage devices into a second storage device among the N number of storage devices not stored with the first data by transmitting the first data via the second network, when the first data cannot be read, each node starts a replication process to generate a replication comprising
each node generating a second mapping pattern table that is equivalent to the first mapping pattern table;
each node changing the first allocation table into a second allocation table; and
second nodes copying the replication in the second storage device to a third storage device via the second network based on the second mapping pattern table and the second allocation table.

6. A replication system comprising:
N number (N≥3) of storage devices; and
N number of nodes, which are connected to a host via a first network and are connected to the N number of storage devices via a second network, each to receive a request for accessing a storage device associated with itself and to have an access with a content in response to the received access request to the storage device, each node comprising a first mapping pattern table and a first allocation table, the first mapping pattern table stores all permutations of pieces of identifying information in the storage devices enabling the permutations to be identified by pattern identifiers, the first allocation table associates ranges of hash values with any one of the pattern identifiers, wherein when a node among the N number of nodes receives a write request of a certain item of data from the host, each of M number (M <N) of nodes, among the N number of nodes, including the node stores the data into the storage device associated with itself, each node executes a replication based on a calculated hash value of a writing target extent key contained in the write request, the first allocation table and the first mapping pattern table, each node writes a file based on the calculated hash value, each node has a function of copying data in the storage device associated with itself into another storage device by transmitting the data via the second network, when a node among the N number of nodes receives the write request of data from the host, each of M number (1<M <N) of nodes, among the N number of nodes, including the node stores the data in the storage device associated with itself, and each node has a function of copying data in the storage device associated with itself into another storage device by transmitting the data via the second network, when first data in a first storage device among the N number of storage devices cannot be read, the first data stored in a storage device among the N number of storage devices is stored into a second storage device among the N number of storage devices not stored with the first data by transmitting the first data via the second network, when the first data cannot be read, each node starts a replication process to generate a replication comprising
- each node generating a second mapping pattern table that is equivalent to the first mapping pattern table;
- each node changing the first allocation table into a second allocation table; and
- second nodes copying the replication in the second storage device to a third storage device via the second network based on the second mapping pattern table and the second allocation table.

* * * * *